United States Patent
Ward et al.

(10) Patent No.: US 7,321,179 B2
(45) Date of Patent: Jan. 22, 2008

(54) RADIALLY CLAMPED BALL AND SOCKET SERIES AND PHASE CONNECTOR

(75) Inventors: Robert Alan Ward, Rockledge, FL (US); Anthony Dean Renda, Libertyville, IL (US)

(73) Assignee: Siemens Power Generation, Inc., Orlando, FL (US)

( * ) Notice: Subject to any disclaimer, the term of this patent is extended or adjusted under 35 U.S.C. 154(b) by 396 days.

(21) Appl. No.: 11/150,068

(22) Filed: Jun. 10, 2005

(65) Prior Publication Data

US 2005/0275306 A1 Dec. 15, 2005

Related U.S. Application Data

(60) Provisional application No. 60/579,347, filed on Jun. 14, 2004.

(51) Int. Cl.
*H02K 33/00* (2006.01)
*H02K 35/00* (2006.01)
*H02K 3/51* (2006.01)
*H01R 4/00* (2006.01)
*H01R 9/00* (2006.01)

(52) U.S. Cl. ................. 310/260; 310/71; 310/91; 310/270; 439/798; 439/811

(58) Field of Classification Search .......... 30/71, 30/91, 260, 270; 439/798, 782, 883
See application file for complete search history.

(56) References Cited

U.S. PATENT DOCUMENTS 2,907,977 A * 10/1959 Daley .................. 439/798
4,199,700 A * 4/1980 Daugherty et al. .......... 310/71
4,385,254 A * 5/1983 Vakser et al. ............... 310/260
4,806,807 A * 2/1989 Levino ..................... 310/71
4,894,575 A * 1/1990 Nilsson et al. .............. 310/260
5,270,598 A * 12/1993 Holly et al. ................ 310/71
5,606,212 A * 2/1997 Sasa et al. .................. 310/270
5,674,098 A * 10/1997 Inaba et al. ................. 439/883

FOREIGN PATENT DOCUMENTS

JP 06335188 A * 12/1994

* cited by examiner

*Primary Examiner*—Tran Nguyen

(57) ABSTRACT

The present invention comprises a U-bolt connector for connecting pairs of stator coil headers 2 with ball headers 6 comprising, a U-bolt 16, top capping pieces 18,20, bottom capping pieces 20, 21, a variable piece 24, and a tightening mechanism 26. The top capping pieces 18,20 secure one ball connector in the pair of stator coil headers and the bottom capping pieces 20, 21 secure another ball connector in the pair of stator coil headers, while the variable piece 24 is disposed between the top capping pieces and the bottom capping pieces. The U-bolt 16 embraces the top capping pieces 18,20, the bottom capping pieces 20, 21 and the variable piece 24, where the tightening mechanism 26 holds the U-bolt tightly to the top capping pieces, the bottom capping pieces and the variable piece and is located at the end of the U-bolt.

14 Claims, 3 Drawing Sheets

RADIALLY CLAMPED BALL AND SOCKET SERIES AND PHASE CONNECTOR

CROSS-REFERENCE TO RELATED APPLICATIONS

This invention claims priority to U.S. provisional 60/579,347, filed Jun. 14, 2004, entitled Radially Clamped Ball and Socket Series and Phase Connector.

FIELD OF THE INVENTION

The field of the invention relates to stator coil connector bars.

BACKGROUND

Large generators utilize stator coils, also called bars, of which a pair of stator coil halves constitute one stator coil. The stator coils are located in radial slots running along the axial length of the stator core. Within each slot are two stator coil halves, one positioned on top of the other. To complete the electrical circuit, these stator coil ends are electrically and mechanically connected together at the outboard ends of the generator. Additionally, phase coils are connected to the parallel circuit rings in a similar manner.

The leading prior art for connectors can be found in U.S. Pat. No. 4,894,575. The prior art is exemplified in FIG. 1, where the header 2 and cap 4 of the coil terminate in a ball 6 that will be braced by a connector bar 10, which are a type of bracket, that is held together by bolts 12. The connector bars 10 consist of two halves, encapsulating the header ball 6. This requires side access to the bolting hardware between adjacent coils, which is often very limited. The process of installing the connector, tightening the bolts, and verifying the adequate clamping is time consuming and difficult. Further, variations in the spacing between the header balls requires that multiple sizes of the connector bars be produced. When the connector bars are being installed, the on-site installer is required to have multiple quantities of each size so that variations in the header ball spacing can be accommodated. Therefore the on-site installer is required to supply many more connector bars than will ultimately be used.

What is needed is an apparatus that is easier to install than the connector bars of the prior art and that will also accommodate the variations in the ball spacing. Other difficulties with the prior art also exist, some of which will be apparent upon further reading.

SUMMARY OF THE INVENTION

With the foregoing in mind, methods and apparatuses consistent with the present invention, which inter alia facilitates the connection of ball headers at the terminus of stator coils, includes a variable connector that locks the stator coils together with a U-bolt. The tightening mechanism for the U-bolt is easily accessible from a top or bottom position and only a small section of the apparatus that fits between the ball headers needs to be made in variable quantities.

These and other objects, features, and advantages in accordance with the present invention are provided particular embodiments by a U-bolt connector for connecting pairs of stator coil headers with ball headers comprising, a U-bolt, top capping pieces, bottom capping pieces, a variable piece, and a tightening mechanism. The top capping pieces secure one ball connector in the pair of stator coil headers and the bottom capping pieces secure another ball connector in the pair of stator coil headers, while the variable piece is disposed between the top capping pieces and the bottom capping pieces. The U-bolt embraces the top capping pieces, the bottom capping pieces and the variable piece, where the tightening mechanism holds the U-bolt tightly to the top capping pieces, the bottom capping pieces and the variable piece and is located at the end of the U-bolt.

In another embodiment the present invention provides for a variable connector for or connecting pairs of stator ball headers comprising a top cap, two common center sections, a bottom cap, a variable piece, a U-bolt, and a tightening mechanism. The top cap and one of the two common center sections secure one of the pair of stator ball headers, and the bottom cap and another of the two common center sections secure the other of the pair of stator ball headers. The variable piece is disposed between the two common center sections, and the U-bolt embraces the top cap, the two common center sections, the variable piece and the bottom cap. The tightening mechanism holds the U-bolt tightly to the top cap, the two common center sections, the variable piece and the bottom cap and is located at the end of the U-bolt, and where changing the variable piece adjusts the size of the variable connector.

In a related embodiment, the variable piece comprises a plurality of pieces. Wherein in another embodiment, the variable section and one of the two common center sections are a single unit.

Other embodiments of the present invention also exist, which will be apparent upon further reading of the detailed description.

BRIEF DESCRIPTION OF FIGURES

The invention is explained in more detail by way of example with reference to the following drawings.

DETAILED DESCRIPTION OF THE INVENTION

The present invention provides for a connector for the header balls at the terminus of stator coils that is easily accessible for tightening and that accommodates variations in the spacing between the ball headers. Stator coils are essentially large copper bars that sit in slots. These bars are capped by a header/cap/ball assembly. Since the stator coils come in pairs, the adjacent pairs need to be connected, both electrically and mechanically, by the header balls. Variations in the spacing between the coils, however, have required that connectors come in multiple sizes, even for the same model of machine. Further, to tighten the connector of the prior art is often difficult.

The U-bolt connector of the present invention allows for a uniform assembly with a small variable section to accommodate variations in the spacing between ball headers. In addition, the tightening mechanism of the U-bolt connector can be easily accessed from a top or bottom position rather than from a side position as is now practiced in the prior art.

Figure 1:
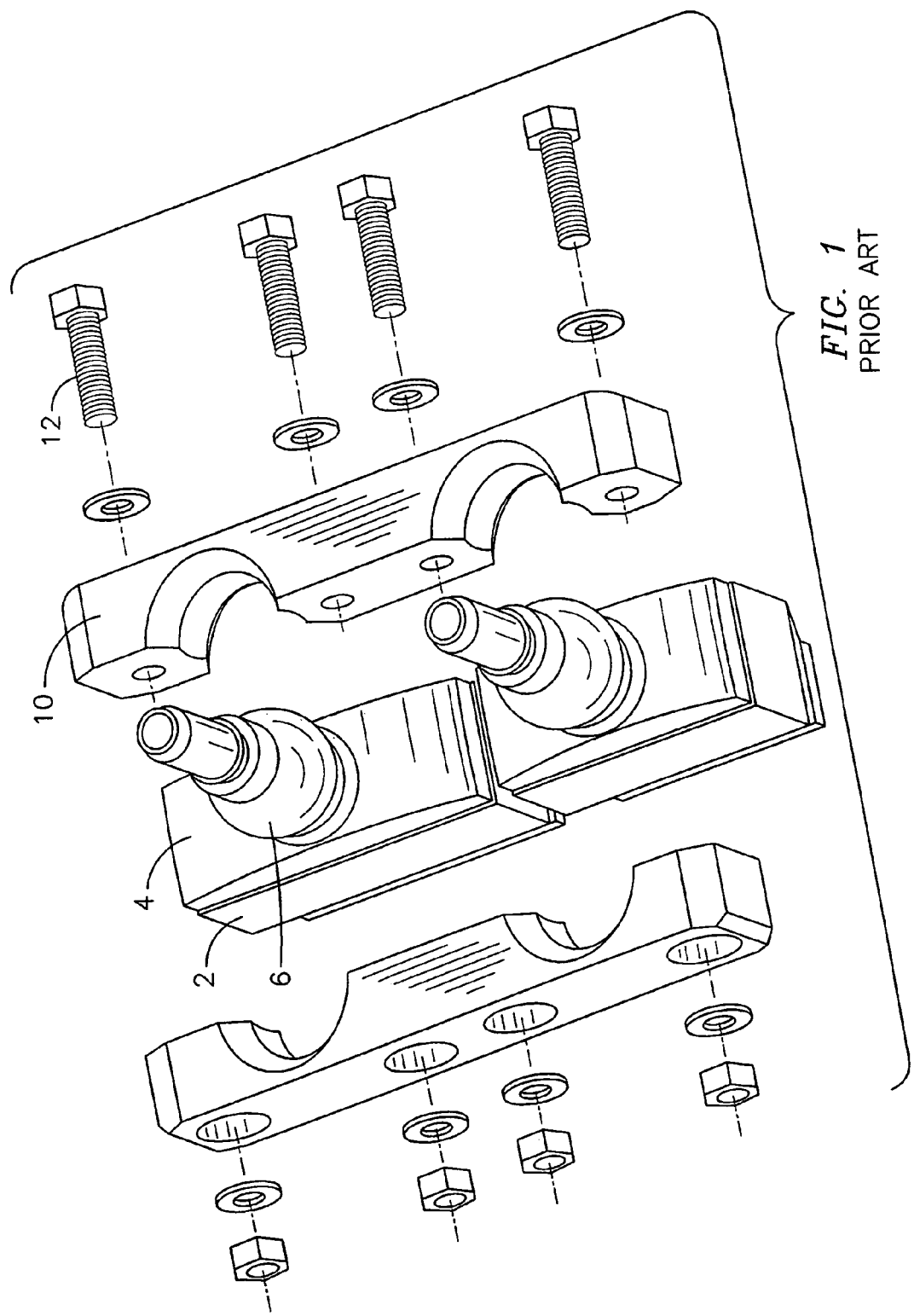
FIG. 1 illustrates a connector bar of the prior art.
Figure 2:
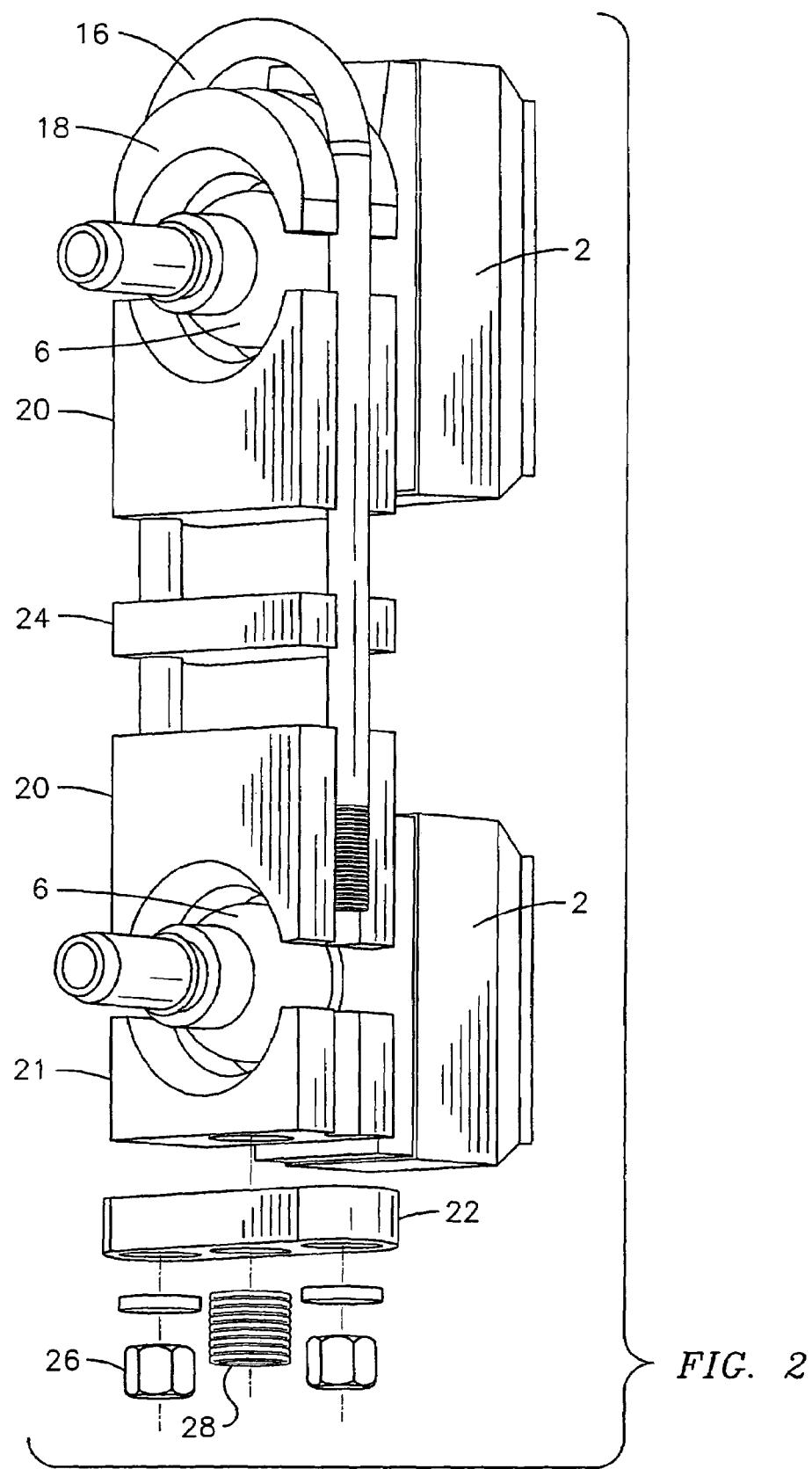
FIG. 2 illustrates an exploded view of a U-bolt connector joining two ball headers according to one embodiment of the present invention.

FIG. 2 illustrates an exploded view of one embodiment of the present invention. As discussed above, headers 2 are positioned at the ends of stator coils (not shown). The ball joint section allows for some variance in the spacing between the headers, primarily in the x and z dimensions, but the U-bolt assembly provides for quick and easy adjustments in the y dimension. In this embodiment the assembly comprises a top cap 18, two common center sections 20, a bottom cap 21 and a U-bolt 16 than embraces all of these parts and is tightened by some means, such as nuts 26. Other tightening means may also include bolts with Belleville™ washers, levers, cranks, cams, removable hydraulic tensioners, and slides and similar devices. All of these pieces may be of a standard dimension, suited for particular coil types. Having the tightening means at the ends of the U-bolt also allows for the two legs of the U-bolt to be tightened simultaneously, which is particularly advantageous when using a hydraulic tensioner. The caps and matching common center section may be referred to collectively as capping pieces. Therefore the top cap and matching common center section may be called top capping pieces, and the bottom cap and matching common center section may be called bottom capping pieces. Other configurations for the capping pieces will be apparent to one of ordinary skill in the art, and in some cases the assembly may be installed upside-down with equally advantage.

A variable piece 24, which in this embodiment is located near the center of the assembly, is included to accommodate differences in the spacing between the headers. By changing just this variable piece, spacing differences between the headers can be managed quickly and efficiently. In the embodiment shown the variable piece is a single block and different sized blocks are available for different spacings. However, in other embodiments the variable piece may comprise a stack that is taken from or added to to fine tune the variability. Since an electrical current passes through the sections, they are made of a conducting material, such as copper, and should have a plating at the points of contact, such as silver.

Note that the sections of the assembly shown are illustrated as flat-edged. In other words one piece abuts the other on a smooth plane. The present invention includes variations on this where the pieces have interlocking ridges, flanges, divots, etc. In addition, the center section is shown as comprising essentially a square angled block. Other embodiments include more of a parallelogram shape, though flat parallel and planar surface will support a greater load.

Figure 3:
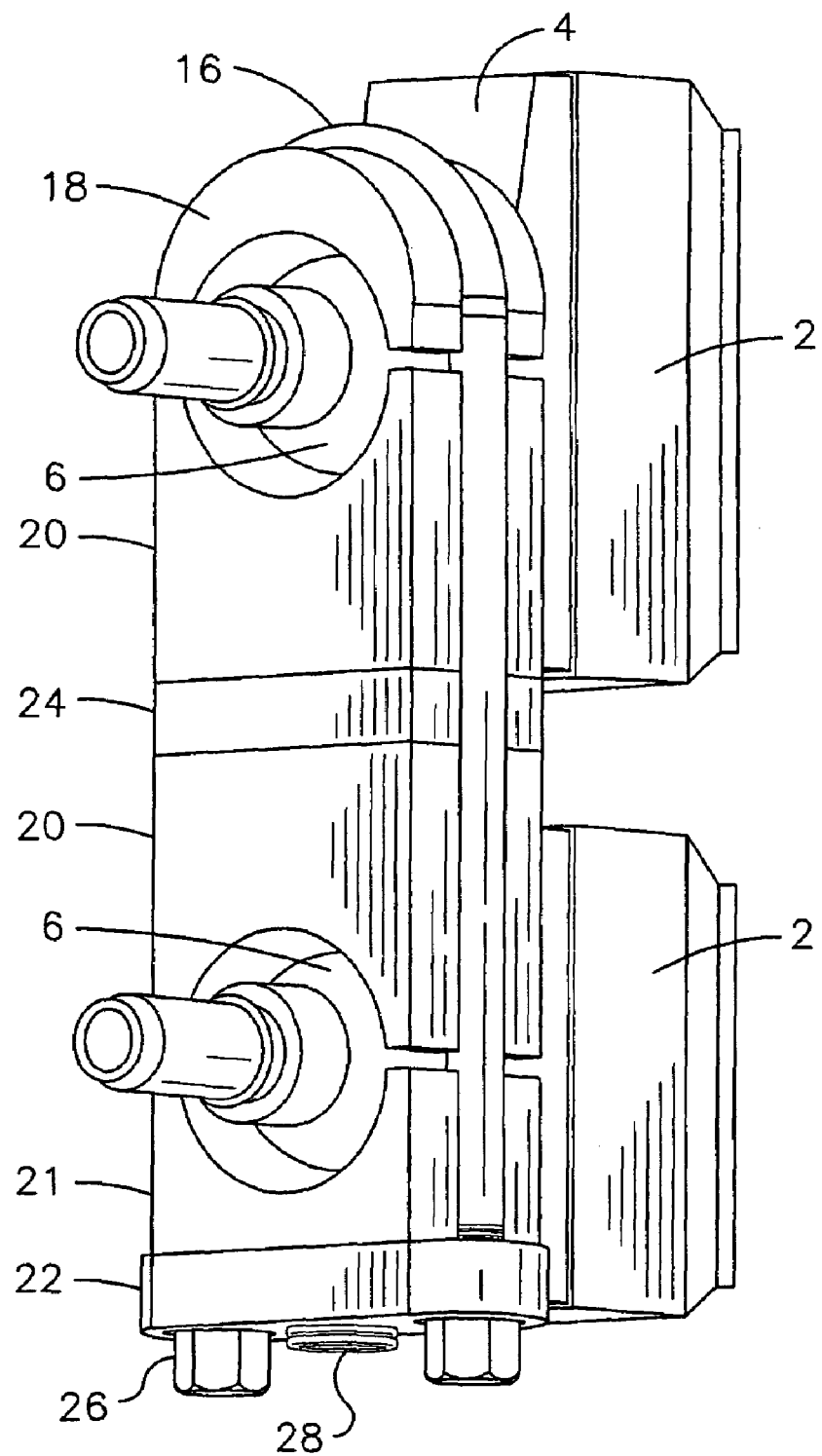
FIG. 3 illustrates an assembled view of a U-bolt connector joining two ball headers according to one embodiment of the present invention.

Referring to FIG. 3, an assembled view of the embodiment illustrated in FIG. 2 is shown. Also shown in FIGS. 2 and 3 are a bottom plate 22 and jack screw 28. This is one type of mechanism that allows for a quick tightening of the U-bolt assembly. For instance, once the assembly has been completed, an adjustment to the jack screw can change the spacing between the bottom cap and the bottom plate, by stretching the U-bolt, tightening or loosening the assembly accordingly. Verification of the load can be checked by measuring the gap between the bottom plate and bottom cap. The U-bolt itself is made from a strong alloy, such as a stainless steel Nitronic 32™. There is some inherent flexibility in the U-bolt design, so that small amounts of mechanical creep can be taken up by the assembly.

In some embodiments, the connector requires tightening of only one or two fasteners, which is easily accessible from the outer diameter of the stator coil endwindings. The easy accessibility of the tightening mechanism allows for an even more limited space between adjacent connectors than is currently provided in the art. The assembly may even be provided in a pre-assembled configuration, further saving time in the field.

In one embodiment the present invention provides for a U-bolt connector for connecting pairs of stator coil headers with ball headers comprising, a U-bolt, top capping pieces, bottom capping pieces, a variable piece, and a tightening mechanism. The top capping pieces secure one ball connector in the pair of stator coil headers and the bottom capping pieces secure another ball connector in the pair of stator coil headers, while the variable piece is disposed between the top capping pieces and the bottom capping pieces. The U-bolt embraces the top capping pieces, the bottom capping pieces and the variable piece, where the tightening mechanism holds the U-bolt tightly to the top capping pieces, the bottom capping pieces and the variable piece and is located at the end of the U-bolt.

In a related embodiment, the U-bolt, the top capping pieces and the bottom capping pieces are of a standard size for each type of stator coil to which the pairs of stator coil headers are parts of. In a further related embodiment, the variable piece comprises a stack of variable pieces.

In another related embodiment, the tightening mechanism comprises one of bolts levers, cranks and slides. A bottom plate may be located at the bottom of the U-bolt connector, and an additional tightening mechanism may be present at the end of the U-bolt. The additional tightening mechanism is a jack bolt and bottom plate.

In still another embodiment, the top capping pieces, the bottom capping pieces and the variable piece are interlocking.

In another embodiment the present invention provides for a variable connector for or connecting pairs of stator ball headers comprising a top cap, two common center sections, a bottom cap, a variable piece, a U-bolt, and a tightening mechanism. The top cap and one of the two common center sections secure one of the pair of stator ball headers, and the bottom cap and another of the two common center sections secure the other of the pair of stator ball headers. The variable piece is disposed between the two common center sections, and the U-bolt embraces the top cap, the two common center sections, the variable piece and the bottom cap. The tightening mechanism holds the U-bolt tightly to the top cap, the two common center sections, the variable piece and the bottom cap and is located at the end of the U-bolt, and where changing the variable piece adjusts the size of the variable connector.

In a related embodiment, the variable piece comprises a plurality of pieces. Wherein in another embodiment, the variable section and one of the two common center sections are a single unit.

In one embodiment the tightening mechanism comprises a nut and compressible washer at the two terminuses of the U-bolt. This may be aided by the U-bolt further embracing a bottom plate.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A U-bolt connector for connecting pairs of stator coil headers with ball headers comprising:
   a U-bolt;
   top capping pieces;
   bottom capping pieces;

a variable piece; and a tightening mechanism;

wherein said top capping pieces secure one ball connector in said pair of stator coil headers and said bottom capping pieces secure another ball connector in said pair of stator coil headers;

wherein said variable piece is disposed between said top capping pieces and said bottom capping pieces;

wherein said U-bolt embraces said top capping pieces, said bottom capping pieces and said variable piece;

wherein said tightening mechanism holds said U-bolt tightly to said top capping pieces, said bottom capping pieces and said variable piece and is located at the end of said U-bolt.

2. The U-bolt connector of claim 1, wherein said U-bolt, said top capping pieces and said bottom capping pieces are of a standard size for each type of stator coil to which said pairs of stator coil headers are parts of.

3. The U-bolt connector of claim 1, wherein said tightening mechanism comprises one of bolts, levers, cranks, cams, removable hydraulic tensioners, and slides.

4. The U-bolt connector of claim 1, wherein a bottom plate is located at the bottom of said U-bolt connector.

5. The U-bolt connector of claim 1, wherein an additional tightening mechanism is present at the end of said U-bolt.

6. The U-bolt connector of claim 5, wherein said additional tightening mechanism is a jack bolt and bottom plate.

7. The U-bolt connector of claim 1, wherein said variable piece comprises a stack of variable pieces.

8. The U-bolt connector of claim 1, wherein said U-bolt connector is connected to said stator coil headers upside-down.

9. The U-bolt connector of claim 1, wherein said top capping pieces, said bottom capping pieces and said variable piece are interlocking.

10. A variable connector for or connecting pairs of stator ball headers comprising;

a top cap;

two common center sections;

a bottom cap;

a variable piece;

a U-bolt; and a tightening mechanism;

wherein said top cap and one of said two common center sections secure one of said pair of stator ball headers, and wherein said bottom cap and another of said two common center sections secure the other of said pair of stator ball headers;

wherein said variable piece is disposed between said two common center sections;

wherein said U-bolt embraces said top cap, said two common center sections, said variable piece and said bottom cap;

wherein said tightening mechanism holds said U-bolt tightly to said top cap, said two common center sections, said variable piece and said bottom cap and is located at the end of said U-bolt;

wherein changing said variable piece adjusts the size of said variable connector.

11. The variable connector of claim 10, wherein said variable piece comprises a plurality of pieces.

12. The variable connector of claim 10, wherein said tightening mechanism comprises a nut and compressible washer at the two terminuses of said U-bolt.

13. The variable connector of claim 10, wherein said U-bolt further embraces a bottom plate.

14. The variable connector of claim 10, wherein said variable section and one of said two common center sections are a single unit.

* * * * *